Patented June 4, 1935

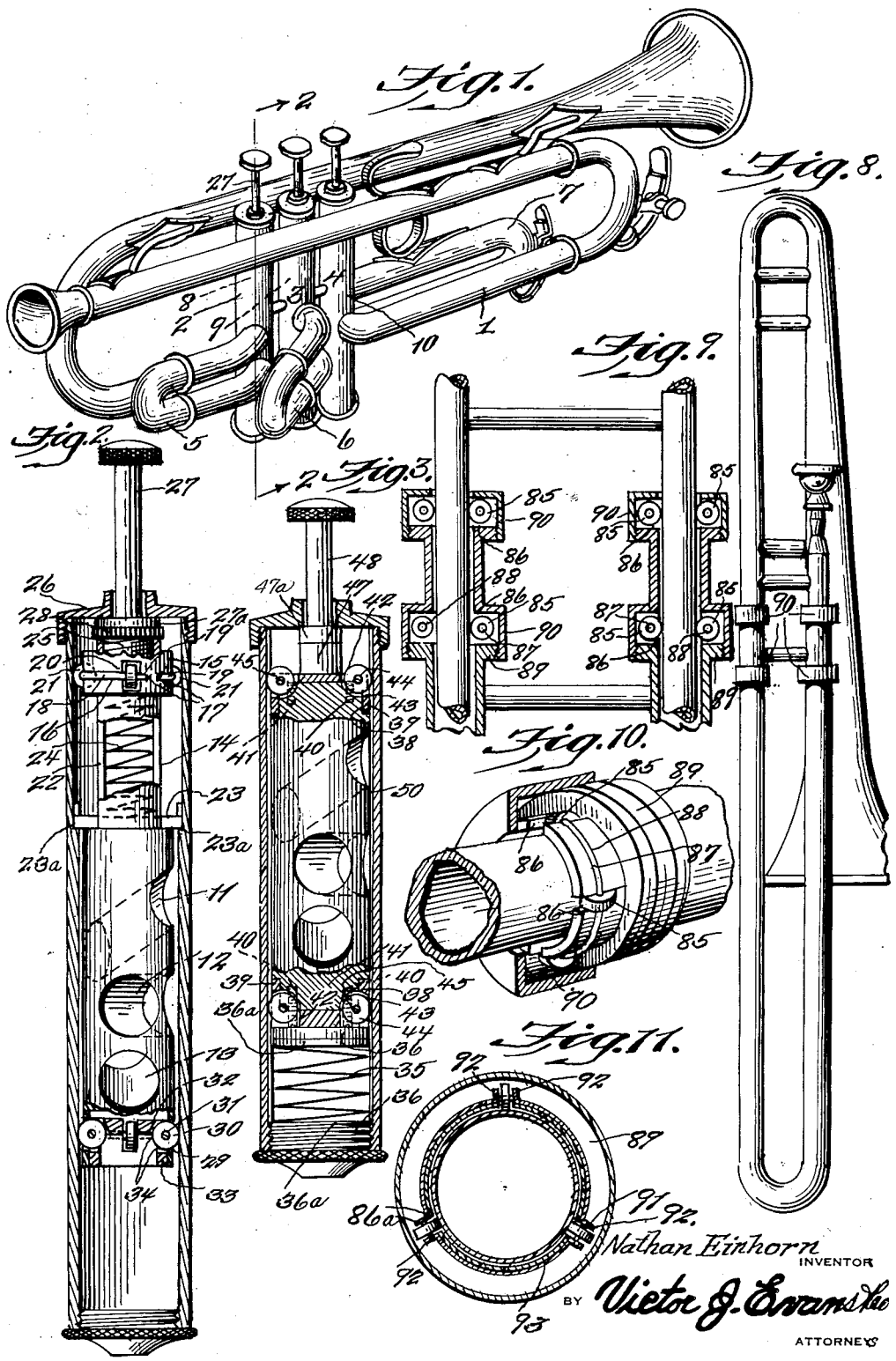

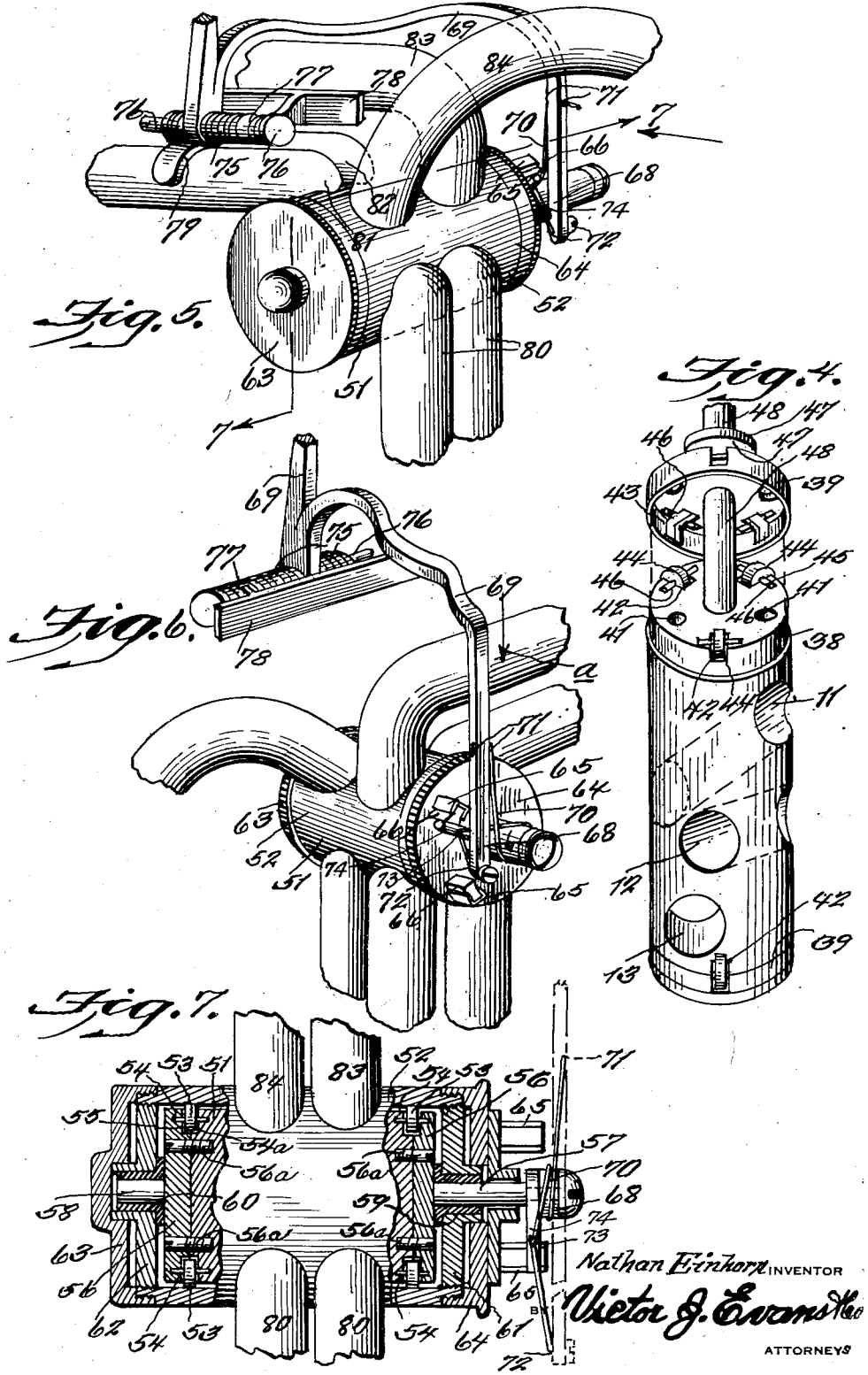

2,003,995

UNITED STATES PATENT OFFICE 2,003,995

GUIDING ACTION FOR VARIOUS VALVES AND SLIDES FOR MUSICAL, BRASS, AND OTHER INSTRUMENTS

Nathan Einhorn, Philadelphia, Pa.

Application October 9, 1934, Serial No. 747,634

8 Claims. (Cl. 84—392)

This invention relates to an improved guiding action for use in connection with valves either reciprocating or revoluble type and slides of various brass and other similar musical instruments, and the purpose of the invention is to eliminate lubrication and friction in normal extreme hot or cold temperature.

With this improved guide action sluggish movements of the valve key are eliminated for brass players, lubrication worries avoided, and by including a much lighter spring than ever before used, enables an artist to play with more life and velocity, insuring finer phrasing and cleaner technique, hence truly making playing a pleasure instead of labor.

Another purpose is to provide anti-frictional roller or wheel bearing (oiled or oilless) and silent to the extreme when employing roller or wheel bearings constructed of non-metallic material.

Still another purpose is to provide an action or bearing of this kind, wherein it is the aim to reduce the friction to a minimum, practically eliminate entirely all the friction, thereby making it possible to use springs of very much lighter tension. The spring employed to urge a valve into open position, the same being of very much lighter tension, may be depressed easier and as a result much faster to return to initial or closed position, and also the spring will adjust itself quicker into open position.

Still another purpose is to provide, in a device of this kind, roller or wheel bearings, for retaining the valve or slide in alignment, whether the valve be of the rotary or reciprocating type, said roller or wheel bearings acting to retain the valve in such a position and true alignment with the cylinder, whereby the valve or slide never contacts with the side walls of the cylinder, and will also insure perfect aligned hole connections between the valve and the slides or tubing.

A further purpose is to provide a device of this kind, wherein in addition to eliminating lubrication and friction, it is the aim to provide a simple construction of valve action which is noiseless which can be applied to second hand instruments or applied to all musical brass instruments at the time of their manufacture, and since the roller bearings or wheels are constructed of any suitable fiber material preferably wood or metal, the guide action as applied to brass musical instruments will remain durable for a lifetime without lubrication and noise, the only possible repairs which may be needed would be the renewal of the roller bearings or wheels.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:—

Figure 1 is a perspective view of a trumpet showing the first, second and third valves, the valves proper therein constructed in accordance with the invention.

Figure 2 is a sectional view on line 2—2 of Figure 1 showing the valve of a second hand instrument constructed in accordance with the invention.

Figure 3 is a sectional view through the first valve of a trumpet newly manufactured, the reciprocating valve being constructed in accordance with the invention.

Figure 4 is a perspective view of the valve shown in Figure 3.

Figure 5 is a perspective view of the third valve cylinder of a French horn, wherein the valve on the interior of the cylinder is constructed in accordance with the invention.

Figure 6 is a view of the same part of the French horn in Figure 5 but showing the same in an opposite direction to that in Figure 5.

Figure 7 is a partial sectional view on line 7—7 of Figure 5.

Figure 8 is a view in elevation of a conventional type of trombone, showing the guiding action as applied thereto.

Figure 9 is a sectional view through the guiding action as applied in the sectional view in Figure 8.

Figure 10 is an enlarged fragmentary view in perspective more clearly showing the guiding action for the trombone.

Figure 11 is a transverse sectional view through a modified construction of guiding action as used for a trombone.

Referring to the drawings 1 identifies a trumpet as a whole, which comprises the first, second and third valve cylinders 2, 3, and 4 as well as the first, second and third valve slides 5, 6, and 7, with which the first, second and third valves 8, 9, and 10 (which are mounted in the cylinders 2, 3, and 4) cooperate for rendering various notes when playing a musical number. These valves are cylindrical and capable of reciprocation in their cylinders and are provided with necessary valve openings 11, 12, and 13 for registering with the passageways in the several slides 5, 6, and 7 for producing the various notes when playing a musical number. In a second hand trumpet where the valve has a reduced extension 14, a collar 15 is made integral with the reduced extension and the cylindrical surface of this collar has an annular groove 16, which is provided with opposed shoulders 17. The annular groove receives an open or split ring, 18, the opposed ends 19 of which cooperate with the shoulders to limit the open ring in extreme movement in the groove. The collar has slots 20 for the reception of roller or wheel bearings 21, which are revolubly mounted on the open ring. These roller or wheel bearings cooperate against the inner cylindrical surface of the valve cylinders 2, 3, and 4, and while these roller or wheel bearings may be made of metal, in some instances, it is a particular purpose of this invention to construct them of any suitable metal or hardened fibrous material, preferably wood or the like, thereby insuring a noiseless guiding action, wherein lubrication of any kind is avoided.

Also in second hand trumpets the reduced extension of the valve is hollow and diametrically slotted as shown at 22, the opposite slots receiving a cross head 23, which engage opposite notches 23a in the wall of the valve cylinder, thereby preventing the valve from rotating and insuring at all times the registering of the valve openings with the various passages of the valve slides. An expansion coil spring 24 is mounted in the reduced extension of the valve, one end of which bears upon the cross head mounted in the opposite slots, the other end bearing against the inner end wall 25 of the reduced extension. A cap or cover 26 is threaded to the end of the valve cylinder, the reduced valve stem 27 passing through an opening in the cap or cover. A suitable collar 28 is mounted upon the reduced valve stem against one end of the reduced extension. This collar may be constructed of any suitable fibrous material preferably wood or the like, there being cork washer 27a next to the collar. The other end of the valve is cylindrically countersunk and the cylindrical wall adjacent the countersink is provided with slots 29 for the reception of arguto roller bearings or wheels 30, which rotate on a split ring 31, which rests against a shoulder 32, there being a collar 33 fitted into the countersink and made secure in any suitable manner, for instance shrunk into place or threaded, soldered, welded or otherwise secured therein. The collar 33 bears against the split ring and binds the same in place. The collar 33 is provided with notches 34 accommodating the fiber roller bearings or wheels, which bear against the inner cylindrical surface of the valve cylinder. By these remote guiding fiber roller bearings or wheels, the valve is devoid of any contact whatever with the cylinder wall, and owing to the material of the roller bearings and cork washers 27a on the valve stem 27, the guiding action is silent to the extreme, and lubrication of all parts is entirely eliminated.

In trumpets when manufactured the spring 35 for returning the valve to its initial or open position, instead of being in reduced extension of the valve, it is between the bottom of the valve and the bottom of the cylinder, the opposite ends of the spring contacting with fiber and cork discs 36 and 36a, one set adjacent the lower end of the valve and the other set adjacent the bottom of the cylinder to insure reducing the noise to a minimum. In this construction of valve the opposite ends of the valve are reduced as shown at 38 for the reception of flanged caps 39, the outer cylindrical surfaces of the caps being flush with the cylindrical surface of the valve. These caps may be secured on these reduced portions in any suitable manner, either shrunk thereon, or secured in place by screws 40, which pass through the caps and threaded into the cylindrical recesses 41. The end walls of the reduced portions 38 and the circular end wall of the caps 39 having slots 42 and 43 for the reception of the arguto roller bearings or wheels 44, mounted upon stationary pins 45, the ends of which engage in recesses 46 constructed in the adjacent faces of the caps and the end faces of the reduced portions 38, when the caps are fastened in place on the valve.

A fiber abutment disc 47 is mounted upon the valve stem 48, there being a cork washer 47a between the fiber disc 47 and the upper cap of the valve, so that when the valve returns to its initial or open position the cork washer will contact with the cap or cover 39 on the cylinder, thereby insuring silence to the extreme in the guiding action of the valve. This improved guiding action may be applied to all brass musical instruments, such as cornets, trumpets, altos, baritones, tubas, and trombones, and equally as well to French horns, only in the latter case the revoluble type of valve is employed.

In the new trumpet construction these fiber roller bearings or wheels operate in longitudinal grooves 50 constructed in the inner cylindrical wall of the valve cylinder, thereby preventing any revoluble movement of the reciprocating type of valve.

In the French horn as shown in Figure 5 while the valve 51 is still cylindrical in formation it is of the revoluble type, and mounted in a cylinder 52, and as shown in Figure 7 the arguto roller bearings or wheels 53 are mounted on stationary pins 54 at opposite ends of the valve. These arguto roller bearings or wheels are mounted in slots 54a and 55 of the valve and the end discs 56, which are fastened in place on the ends of the valve by means of suitable screws 56a. The fact is this rotary cylindrical type of valve rotates freely within the cylinder without at any time the cylindrical surface of the valve touching at any point against the inner cylindrical surface of the cylinder. Stationary pins for the roller bearings or wheels engage in sockets of the inner face of the end discs of the revoluble valve.

The remote faces of the end discs have reduced extensions 57 and 58, which are revoluble in fiber bearings, 59 and 60, which are fitted frictionally in the opposite cylinder heads 61 and 62, and by means of these fiber bearings lubrication is eliminated, as well as insuring complete silence in the guiding action. The opposite cylinder heads are threaded in place within the opposite ends of the cylinder, that is to say in the French horn construction.

There are suitable caps 63 and 64 threaded over the cylinder heads on the cylinders thereby retaining the cylinder heads in position, which are in turn threaded within the cylinders. The cap 64 of each cylinder is provided with holders 65 for the reception of cork abutments 66. An extension or stem of the revoluble valve has a head 68 fastened thereto, and a conventional type of French horn key 69 is provided. A catgut cord 70 is attached to the arm of the key at 71 and 72 in two distinct places, the cord 70 passing around the head 68 and is fastened at 73 to an arm 74 which is fastened to the head, so by having depressed the key in the direction of the arrow a as in Figure 5 the arm of the key will move laterally, in which event the cord 70 will impart a rotary movement to the head and thence to the revoluble valve, in which case the valve will rotate from open position to a closed position, and thereby register the valve openings with the various valve slides, for the purpose of producing various notes in playing a musical number. The various keys of a French horn are tensioned by means of springs as identified at 75. The keys of this character are pivotally mounted upon a supporting rod 76, which is mounted in bearings 77 carried by a supporting bar 78, which in turn is supported at 79 on one of the tubes of the French horn.

In Figure 5 there is disclosed a portion of the third valve slide 80, of the third valve cylinder and several of the French horn tubes 81, 82, 83, and 84.

Referring to Figure 7 there is disclosed a trombone, which comprises the inner and outer slides, in fact the outer slide telescopes the inner slide, and in order to render these slides noiseless as well as freedom of movement to their extreme extent fiber roller bearings or wheels 85 are provided. In this construction of trombone there is disclosed two modifications of the mounting of these fiber roller bearings and wheels. In the construction in Figures 9 and 10 the roller bearings or wheels are mounted in slots 86 and on a split ring 87, which is mounted in a groove 88. A short distance from the groove 88 the arms of the outer slide have integral collars 89, which are threaded. Suitable housings 90 are threaded on these collars for the purpose of housing the roller bearings or wheels, which are constructed of fibrous material preferably roll on the arms of the inner slide and thereby reduce friction to a minimum, as well as insuring silence. The housings 90 act to prevent foreign matter seeping in and around the roller bearings or wheels. Owing to there being four sets of these roller bearings, two on each arm of the outer slide the sagging of the end of the outer slide when the outer slide is in the first position is prevented, or sagging of the outer slide at its semicircular end when in the seventh position is prevented, thereby making the inner and outer slide free of any frictional contact.

In the modification of the trombone structure in Figure 11 the arms of the outer slide still have the slots 86a, while the plurality of roller bearings or wheels are mounted upon stationary pins 91 fixed in arms 92 of segmental sections 93, which are soldered, electrically welded or otherwise secured to the outer surfaces of the arms of the outer slide, which construction eliminates the use of a split ring 87. In this construction the integral collars 89 are still employed, for supporting the housings 90.

In guiding actions for various valves and slides for musical brass and other instruments, the general standard clearance between the stationary and movable elements approximates three or four thousandths (.003 or .004). However, in the present invention it is the purpose to lessen this clearance to approximate one thousandth (.001), in which event with the improved roller bearings and its mounting means to hold the movable and stationary elements out of contact with substantially less than standard clearance, the movable element of such valves and slides may operate freely and without contact and avoid sluggishness.

The invention having been set forth, what is claimed is:

1. A guiding action for valves and slides of various brass musical instruments, comprising a movable element and a stationary element one within the other, and roller bearings and mounting means therefor, so constructed and arranged at opposite ends of one of the elements and cooperating between them to have surface engagement with one element only so as to hold the adjacent surfaces of said elements out of contact with less than standard clearance and entirely eliminating frictional engagement between said adjacent surfaces of the elements.

2. A guiding action for valves and slides of various brass musical instruments, comprising a movable element and a stationary element one within the other, and roller bearings and mounting means therefor so constructed and arranged at opposite ends on one of the elements and cooperating between said adjacent surfaces of said elements with less than standard clearance, whereby said roller bearings may have surface engagement with one of said elements only.

3. A guiding action for revoluble and reciprocating valve and slides of various brass musical instruments, comprising stationary and movable elements one within the other, roller bearings cooperating between said elements, and means for mounting the roller bearings at one end of one of the elements, said mounting means and the roller bearings being so constructed and arranged to have less than standard clearance between said elements whereby said roller bearings may have surface engagement with one of said elements only.

4. In a guiding action for various types of valves and slides for various brass and musical instruments, stationary and movable reciprocating elements one within the other, one of said elements having remotely spaced axes, rotating members on said axes and engaging a surface of the other element, thereby spacing the movable element throughout its length free of contact with the stationary element, thereby substantially eliminating friction throughout the length of said elements, and means to prevent rotation of the reciprocating movable element.

5. In a guiding action for various types of valves and slides on brass musical instruments, the combination with stationary and movable elements, the latter having axes at its remote opposite ends, of rotating movable members on said axes for rolling engagement against the inner surface of the stationary element retaining the movable element free of contact with the surface of the stationary element throughout its length, thereby substantially entirely eliminating friction.

6. In a guiding action for various types of valves and slides for various brass musical instruments, stationary and movable elements, one within the other, an end of the movable element having axes, rotating members on said axes and in turn rotating against the inner surface of the stationary element thereby retaining the movable element free of contact with the inner surface of the stationary element throughout its length to substantially entirely eliminate friction between the two elements.

7. In a guiding action for various types of valves and slides for various brass musical instruments, stationary and movable elements one within the other, one of said elements having remotely spaced axes, rotating members on said axes and engaging a surface of the other element, thereby spacing the movable element throughout its length free of contact with the stationary element, thereby substantially eliminating friction throughout the length of said elements.

8. In a guiding action for various types of valves and slides for various brass musical instruments, stationary and movable elements, one within the other, the movable element having remotely spaced axes, rotating members on said axes and engaging the surface of the other element, thereby spacing the movable element throughout its length free of contact with the stationary element, means on the movable element for supporting said axis for in turn supporting said rotating members, thereby spacing said movable element from the stationary element at all times.

NATHAN EINHORN.